Figure 1:
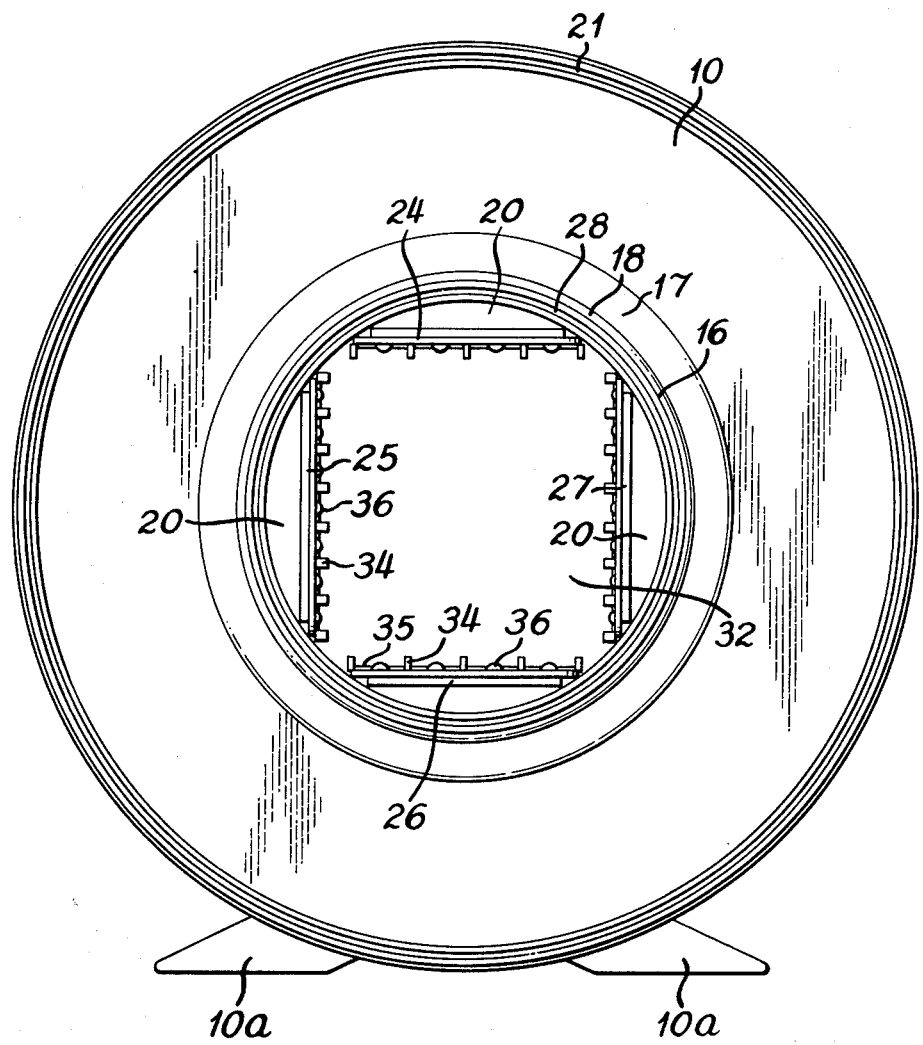

United States Patent [19]
Rumble

[11] 3,963,287
[45] June 15, 1976

[54] STORAGE DEVICES

[76] Inventor: Richard Roy Rumble, 47 Orchard Court, Portman Square, London, W.1, England

[22] Filed: Jan. 16, 1975

[21] Appl. No.: 541,433

[30] Foreign Application Priority Data
Jan. 19, 1974   United Kingdom............... 60244/74

[52] U.S. Cl............................. 312/197; 206/387; 312/202; 312/285
[51] Int. Cl.²................... A47B 81/00; A47B 81/06
[58] Field of Search ........... 312/197, 202, 111, 285, 312/252; 206/387

[56] References Cited
UNITED STATES PATENTS

| | | | |
|---|---|---|---|
| 347,504 | 8/1886 | Parsons............................. | 312/252 |
| 562,352 | 6/1896 | Boniface............................ | 312/197 |
| 2,214,993 | 9/1940 | DeWitt.............................. | 312/285 |
| 3,666,337 | 5/1972 | Sztorc............................... | 312/111 |
| 3,736,036 | 5/1973 | Mathus.............................. | 312/202 |
| 3,880,484 | 4/1975 | Silina............................... | 312/202 |

*Primary Examiner*—Paul R. Gilliam
*Assistant Examiner*—Alex Grosz
*Attorney, Agent, or Firm*—Arthur B. Colvin

[57] ABSTRACT

The invention relates to a storage device for housing and displaying cassettes and like articles.

The storage device comprises a drum like construction formed by two spaced circular members interconnected around their periphery and provided with an inwardly directed peripheral flange. The spaced side members each have a central aperture for rotatably supporting an inner assembly formed by two ring-like members interconnected by flat connecting elements. The ring-like members each have an inwardly directed annular flange for supporting the inner edges of cassettes positioned between the two stationary space members and which are inserted through slots at suitable positions in the flanges. The cassettes are held spaced apart by a plurality of pins or projections around the inner periphery of the ring-like members.

Storage facilities may also be provided for cassettes within the central portion of the inner rotatably assembly.

2 Claims, 5 Drawing Figures

STORAGE DEVICES

This invention relates to storage devices for housing and displaying cassettes, tape cartridges and similar flat articles (hereinafter referred to generally as cassettes). Although the invention is primarily concerned with the provision of a storage device for cassettes for use in the home, it will be understood that the storage device of the invention may also be used in premises such as shops to enable customers to inspect cassettes displayed therein.

The invention is concerned with storage devices of the kind in which a circular assembly is rotatably mounted in a stationary support. According to the invention the rotatable inner assembly is adapted to receive the cassettes to be displayed with the cassettes located substantially radially, the cassettes being retained in the assembly during rotation thereof by means of the stationary support.

In a preferred embodiment of the invention the stationary support comprises a pair of spaced, circular, side members. Each side member is formed with an annular flange extending inwardly over the outer edges of the cassettes when located in said inner rotatable assembly so as to retain said cassettes therein during rotation of said inner assembly. One or more axially extending slots are formed in said flanges to allow access to the inner assembly for the positioning and removal of cassettes. If desired, the slot or slots may be provided with locking arrangements to prevent unauthorised removal of the cassettes positioned in the inner rotatable assembly.

Figure 2:
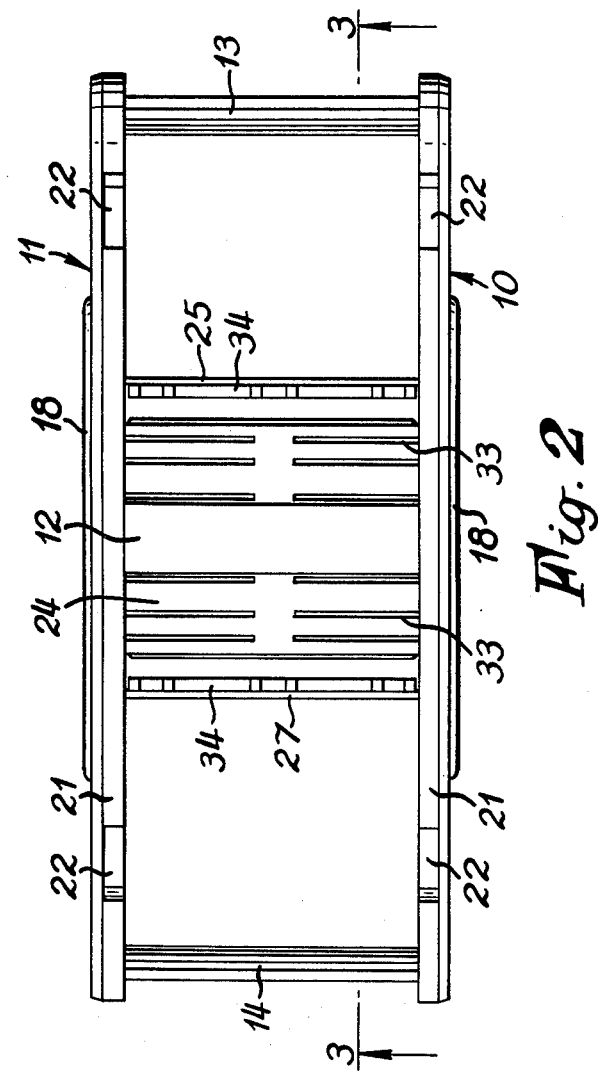
Figure 3:
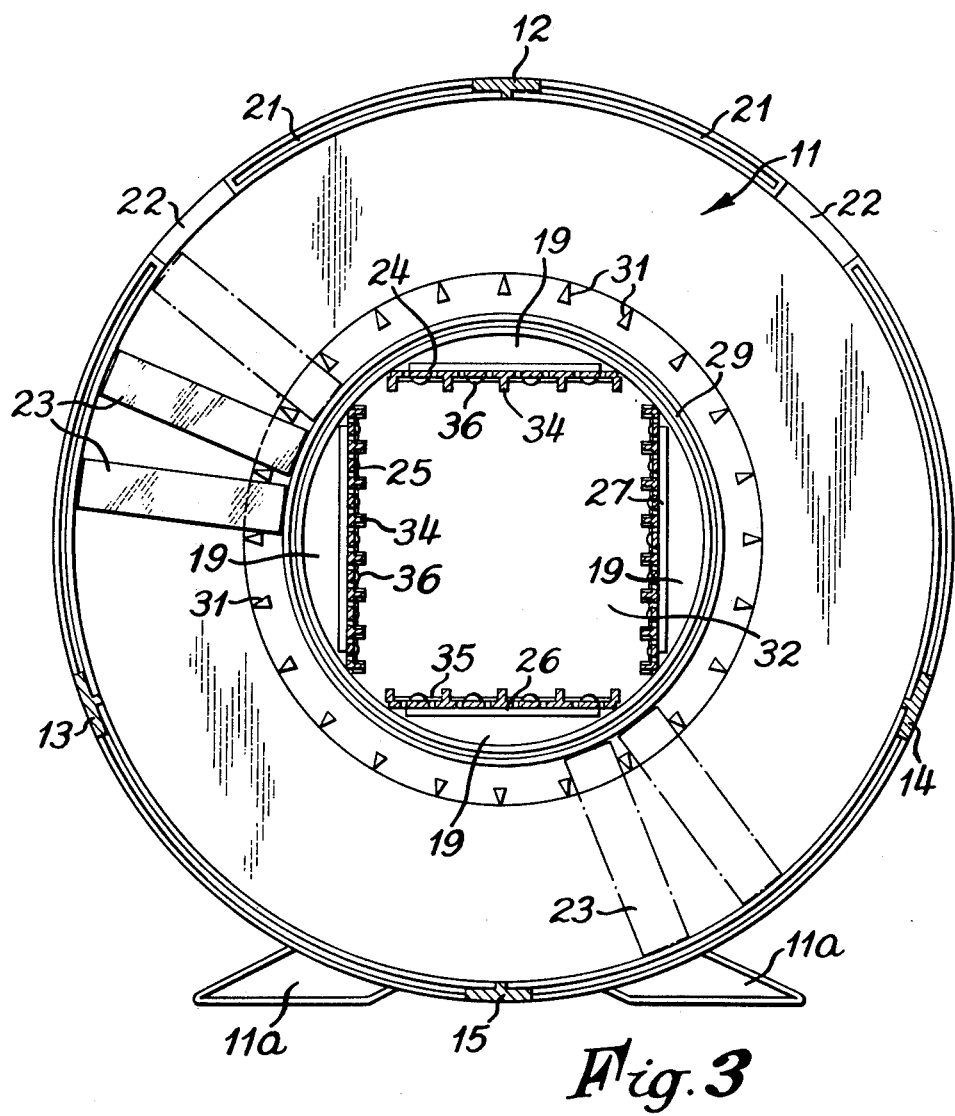
Figure 4:
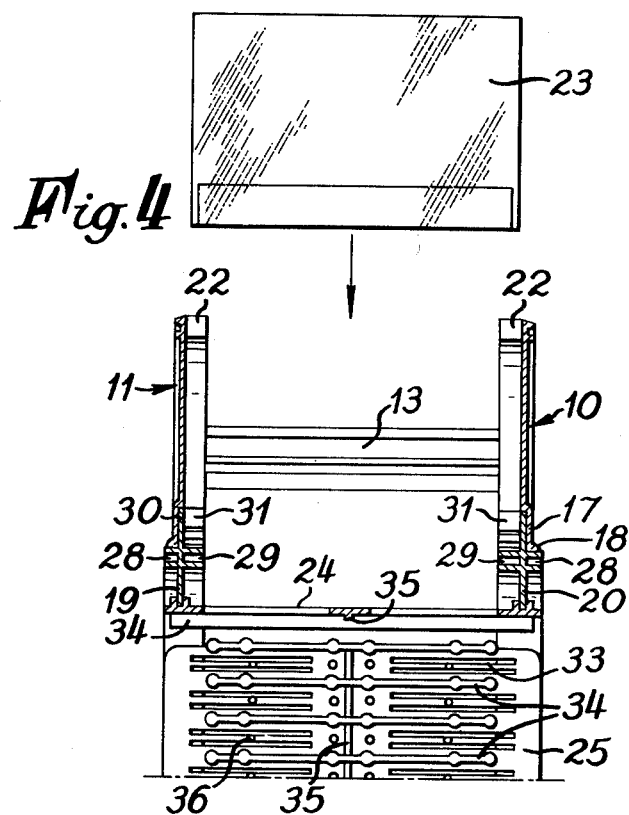
Figure 5:
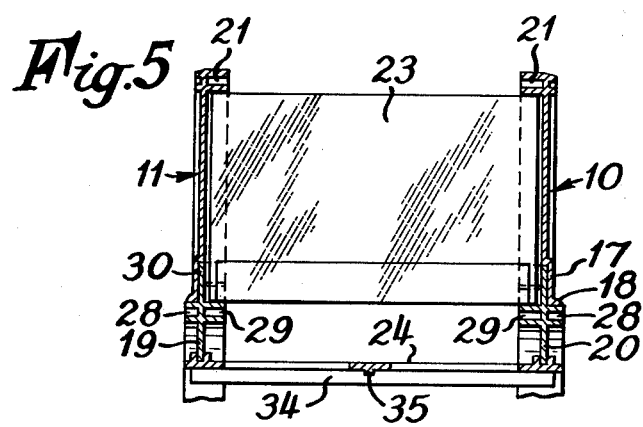

In order that the invention may be fully understood a preferred embodiment will now be described with reference to the accompanying drawings in which:

FIG. 1 is a side elevation of a cassette storage device in accordance with the invention, FIG. 2 is a plan view of the storage device shown in FIG. 1, FIG. 3 is a sectional view taken on the line 3—3 of FIG. 2 and showing cassettes positioned in the storage device, FIG. 4 is a fragmentary sectional view showing the positioning of a cassette in the storage device, and FIG. 5 is a similar fragmentary sectional view showing the cassette positioned in the storage device.

Referring now to the drawings and in particular to FIGS. 1 to 3, the storage device comprises a stationary structure which supports an inner rotatable assembly for receiving the cassettes to be displayed.

The stationary structure comprises a pair of spaced, circular members 10 and 11 preferably made of a suitable plastics, and which are held spaced apart by a plurality of tie bars or suitable connecting members shown by the references 12, 13, 14 and 15. The circular members 10 and 11 are each formed with corresponding extensions 10a and 11a providing spaced feet for supporting the storage device on a display or other surface.

The spaced circular members 10 and 11 form in effect a drum and they are each formed with a central aperture 16 for rotatably receiving and supporting the inner assembly which is mounted therein for rotation about a horizontal axis. It will however, be understood that by mounting the support feet 10a and 11a on one of the spaced members the inner assembly can in fact, be mounted for rotation about a vertical axis.

The spaced members 10 and 11 are each formed with an annular thickened portion 17 around the edge 18 of the central aperture 16 (see FIG. 4) and this thickened portion 17 provides an inner annular bearing surface for locating and receiving the outer edges of a pair of ring-like members 19 and 20 of the inner rotatable assembly.

The spaced circular side members 10 and 11 of the stationary structure are completed by the provision of inwardly extending flanges 21 on each member adapted to project over the edges of cassettes when positioned in the inner rotatable assembly between members 10 and 11 as shown in FIG. 5. The flanges 21 prevent the cassettes from falling from the storage device. Suitable slots 22 are provided in the flanges 21 as shown to allow the insertion or removal of a cassette 23 at a desired position (see FIG. 4).

Although the device is primarily intended for home use it can, of course, be used also in public premises such as a shop for the dislay of cassettes, in which case the slots 22 formed in the flanges 21 on the stationary side members 10 and 11 are provided with a suitable lock plate or other device (not shown) for closing the gap in the flanges to prevent unauthorised removal of a cassette. The lock plate may be pivotally mounted on one side member and engaged with the other side member by means of a locking mechanism.

The inner rotatable assembly is moulded as an integral unit in a suitable plastics and comprises a pair of spaced interconnected ring-like members 19 and 20 interconnected by axially extending tie bars or connecting members 24, 25, 26 and 27. Each ring-like end member 19 and 20 has an outwardly extending annular flange 28 fitting the aperture 16 in the corresponding side member 10 or 11 of the stationary structure and an oppositely located inwardly extending annular flange 29 for supporting the inner edges of the stored cassettes (see FIGS. 3 and 5). The peripheral portion 30 of the ring-like end members 19 and 20 engages the inner recess in the thickened portion 17 of the corresponding side member and is provided on its inner surface with a plurality of spaced pins or projections 31 for radially receiving the inner edges of the stored cassettes (see FIG. 3). The pins 31 are spaced apart around the periphery of the ring-like members 19 and 20 and are preferably of wedge cross-section so as to facilitate the entry of a cassette between adjacent pins on each of the spaced ring-like members. The cassettes 23 are inserted through slots 22 in flanges 21 between the side members 10 and 11 of the stationary structure to engage between two pairs of oppositely positioned pairs of pins 31 until the cassettes engage the projection 29 (see FIGS. 4 and 5). The pins 31 are so positioned as to permit slight pivotal movement of the cassettes when loaded in the storage device.

In use the inner assembly is rotated and during this movement the outer edges of the cassettes 23 engage and slide benath the inner edges of the flanges 21 of the side members 10 and 11 (see FIGS. 3 and 5). Rotation of the inner assembly is preferably obtained by manual engagement of the edges of the cassettes through the annular gap between the flanges 21.

The rotatable inner assembly is constructed so that cassettes can be stored also axially within its central area in addition to the external storage of cassettes radially between the spaced stationary side members 10 and 11 as hereinbefore described.

The internal storage is provided by the four axially extending connecting members 24, 25, 26 and 27 which are positioned within the inwardly directed annular projections 29 of the end members 10 and 11 and comprise separate flat sections. The four sections provide a central aperture 32 through the inner rotatable assembly having a substantially rectangular cross section. The connecting sections are moulded separately and are each formed with slits 33 so that each section provides a plurality of individual axially extending strips supported at each end so as to be individually flexible in a radial direction. The sections are also provided with inwardly directed axial projections 34 providing between adjacent projections axial slots for slidably receiving cassettes in an axial direction within the central area 32 of the inner rotatable assembly. The construction is such as to permit the insertion of cassettes or boxed cassettes from both sides of the device and, if desired, an intermediate transverse stop 35 may be moulded in the sections so as to locate the cassettes in position within the central area.

The rectangular cross section of the central aperture 32 in the inner rotatable assembly is such that the pockets or channels provided by the connecting sections may receive cassettes in one direction between sections 25 and 27 or boxed cassettes in a direction at right angles between sections 24 and 26.

The strips provided by the slits 33 in the connecting sections 24 to 27 extend centrally of the axial slots of the sections and are preferably provided with a projecting pip or boss 36 for engaging the corresponding edge or an inserted cassette 23 as the strips flex to allow the passage of a cassette. The pip or boss 36 is adapted to frictionally engage the edge of the inserted cassettes 23 to prevent accidental dislodgement of the inserted cassette. If the cassette is unboxed the pip or boss is adapted to engage behind the corresponding projections on the inserted cassette.

The tie bar 12 between the side members 10 and 11 may be modified for use as a carrying handle.

The storage device of the invention is simple in construction and has the advantage of storing a considerable number of cassettes in a small space with easy inspection and access.

I claim:

1. A storage device for housing tape cassettes or the like with the end portions thereof accessible for manipulation and visual inspection, comprising a housing including a pair of spaced parallel side members, a circular flange formed on at least one said side member, said flange extending toward and terminating a predetermined distance from said other side member, said side members including central circular apertures, a cylindrical inner assembly mounted between said side members for rotation about an axis normal to said side members and coincident with the axis of said circular flange, said inner assembly including a hub extending between said side members, said hub including a hollow inner periphery accessible through said apertures of said side members, a plurality of regularly spaced projections formed on said hub, said projections extending radially outwardly from said hub, at least one radially directed clearance slot formed in said flange, said slot being directed toward said other side member, the transverse distance between said other side member and said slot being greater than said predetermined distance, whereby a cassette may be inserted into and removed from the space bounded by said hub, side members and circular flange only when an appropriate series of said projections is aligned with a said slot, cassettes within said space and out of registry with said slot being blocked from radial outward movement by said flange, the spacing between said hub and said flange being coordinated with the depth dimension of said cassettes in such manner that said cassettes are permitted a range of angular movement relative to said storage device when mounted therein, the limits of said angular movement being defined by engagement of portions of said cassettes and said flange.

2. A storage device in accordance with claim 1 and including axially directed channel means within said periphery of said hub for holding individual said cassettes.

* * * * *